No. 879,333. PATENTED FEB. 18, 1908.
L. SIMS.
BIRD TRAP.
APPLICATION FILED NOV. 25, 1907.
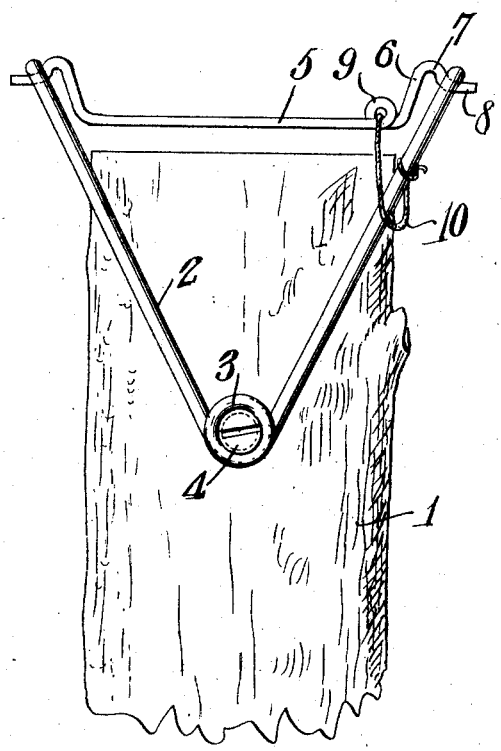
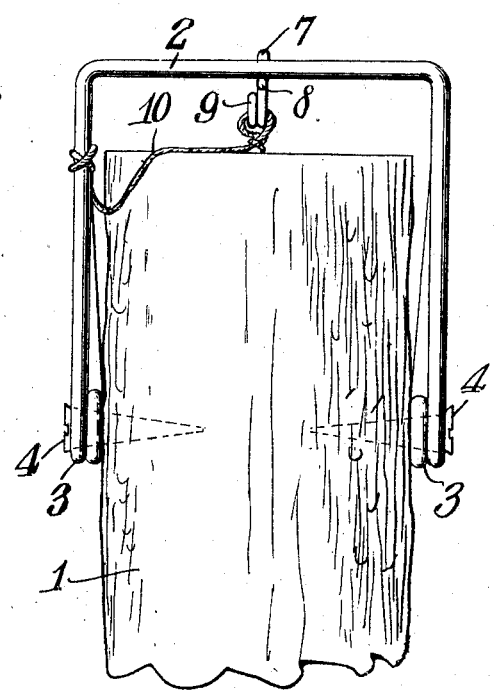
Lawrence Sims,
Inventor

UNITED STATES PATENT OFFICE.

LAWRENCE SIMS, OF BERRYTON, KANSAS.

BIRD-TRAP.

No. 879,333.     Specification of Letters Patent.     Patented Feb. 18, 1908.

Application filed November 25, 1907. Serial No. 403,778.

*To all whom it may concern:*

Be it known that I, LAWRENCE SIMS, a citizen of the United States, residing at Berryton, in the county of Shawnee and State of Kansas, have invented a new and useful Bird-Trap, of which the following is a specification.

This invention relates to traps and it is more particularly designed for catching hawks, crows, etc., it being designed to place a number of traps in convenient positions within a field so as to capture the birds as they alight upon them.

Another object is to provide a trap which can be manufactured at slight cost, can be readily placed in position upon a post or other support and which has a trigger of simple form for holding the jaws of the trap set, said trigger being designed to be released by a bird alighting thereon.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the trap embodying the present improvements. Fig. 2 is an end elevation thereof.

Referring to the figures by characters of reference, 1 designates a post of any suitable size and proportions and embracing the upper portion of the same are two inverted substantially U-shaped jaws 2 preferably formed of a single length of spring wire bent to form coils 3 through which screws 4 or other securing means may be extended into opposite portions of the post. The intermediate portions of the jaws are designed to extend above the post and to be held spaced apart or set by a trigger of novel form which consists of a cross wire 5 having upwardly extending arms 6 adjacent its ends which are crooked to form stop shoulders 7 from which project extensions 8. These extensions are designed to be placed under and against the intermediate portions of the jaws so that said jaws will rest against the shoulders 7 as clearly indicated in Fig. 1. When they are thus disposed the coils 3 are under stress. An eye 9 is preferably formed by coiling the wire 5 and this eye may be connected to one of the jaws by means of a cord, chain, wire or other suitable flexible device such as indicated at 10.

When it is desired to use a trap such as herein described the same is positioned so as to straddle the end of a post and it is fastened in place by inserting screws or nails through the coils 3. The jaws are then spread apart and held by inserting the trigger between them as shown in Fig. 1. When a bird alights upon the post the trigger 5 will be depressed by it and the jaws as soon as released will swing together and catch the bird therebetween.

What is claimed is:

1. A trap comprising oppositely disposed integral spring jaws having coils integral with the adjoining ends thereof, said coils being disposed to receive securing means, and a trigger insertible between the jaws and having upstanding arms forming stop shoulders for the jaws, and extensions insertible under the jaws.

2. A trap comprising oppositely disposed spring jaws and a trigger separate from and insertible between the jaws, said trigger comprising an intermediate portion having upstanding crooked arms constituting shoulders for the jaws, and extensions upon the arms and insertible below the jaws.

3. A trap comprising oppositely disposed spring jaws and a trigger separate from and insertible between the jaws, said trigger comprising an intermediate portion having upstanding crooked arms constituting shoulders for the jaws, extensions upon the arms and insertible below the jaws, and a flexible connection between the trigger and one of the jaws.

4. In a trap the combination with an upstanding support; of oppositely disposed spring jaws straddling the end of the support and connected to opposite portions thereof, and a trigger separate from and insertible between the jaws, said trigger having upstanding crooked arms constituting stop shoulders for the jaws, and extensions upon the arms and insertible beneath the jaws.

5. In a trap the combination with an upstanding support; of oppositely disposed spring jaws straddling the end of the support and connected to opposite portions thereof and a trigger separate from and insertible between the jaws, said trigger having upstanding crooked arms constituting stop shoulders for the jaws, extensions upon the arms and insertible beneath the jaws, said trigger being supported by frictional contact with the opposed jaws, and a flexible connection between the trigger and one of the jaws.

In testimony that I claim the foregoing as my own, I have hereto affixed my signature in the presence of two witnesses.

LAWRENCE SIMS.

Witnesses:
 FRANK B. FAUST,
 F. N. BURLEIGH.